United States Patent
Yuan et al.

(10) Patent No.: US 10,539,423 B2
(45) Date of Patent: Jan. 21, 2020

(54) KEY POINT BASED GUIDING NAVIGATION METHOD, DEVICE AND EQUIPMENT

(71) Applicant: Legao Lejia (Beijing) Information Technology Co., Ltd., Beijing (CN)

(72) Inventors: Haoyang Yuan, Beijing (CN); Xian Wu, Beijing (CN); Geng Chen, Beijing (CN)

(73) Assignee: Legao Lejia (Beijing) Information Technology Co., Ltd. (CN)

( * ) Notice: Subject to any disclaimer, the term of this patent is extended or adjusted under 35 U.S.C. 154(b) by 108 days.

(21) Appl. No.: 15/843,225

(22) Filed: Dec. 15, 2017

(65) Prior Publication Data

US 2019/0011267 A1    Jan. 10, 2019

(30) Foreign Application Priority Data

Jul. 5, 2017  (CN) .......................... 2017 1 0542648

(51) Int. Cl.
  *G01C 21/00*   (2006.01)
  *H04W 4/00*   (2018.01)
  *G01S 5/00*   (2006.01)
  *G01C 21/20*   (2006.01)

(52) U.S. Cl.
  CPC ................. *G01C 21/206* (2013.01)

(58) Field of Classification Search
  CPC ...... G01C 21/00; G01C 21/20; G01C 21/206; G01C 21/26; G01C 21/34; G01S 5/00; H04W 4/00; H04W 4/04; H04W 4/043; H04W 4/33
  See application file for complete search history.

(56) References Cited

U.S. PATENT DOCUMENTS

| | | | | |
|---|---|---|---|---|
| 8,676,623 | B2 * | 3/2014 | Gale | G01C 21/20 705/7.13 |
| 9,400,930 | B2 * | 7/2016 | Moeglein | H04W 4/029 |
| 9,462,423 | B1 * | 10/2016 | Rivlin | H04W 4/02 |
| 2012/0130762 | A1 * | 5/2012 | Gale | G01C 21/20 705/7.13 |
| 2015/0094089 | A1 * | 4/2015 | Moeglein | H04W 4/029 455/456.1 |

FOREIGN PATENT DOCUMENTS

| | | |
|---|---|---|
| CN | 103424113 B | 12/2014 |
| CN | 106918334 A | 7/2017 |

* cited by examiner

*Primary Examiner* — Yonel Beaulieu
(74) *Attorney, Agent, or Firm* — Lerner, David, Littenberg, Krumholz & Mentlik, LLP

(57) ABSTRACT

A key point based guiding navigation method, device, and equipment are disclosed. Said method includes the following steps: based on a first location and a second location, determining a plurality of navigation points from among a plurality of key points located in a predetermined indoor map, where the key points are used to represent accessible directions in the indoor map; generating navigation information for pilot based on orientation of a specific navigation point relative to a current location; and following a predefined displaying rule and based on at least part of the indoor map, displaying the navigation information and navigation point and/or second location.

19 Claims, 5 Drawing Sheets

KEY POINT BASED GUIDING NAVIGATION METHOD, DEVICE AND EQUIPMENT

CROSS REFERENCE TO RELATED APPLICATIONS

The present application claims priority from Chinese Application No. 201710542648.5 filed Jul. 5, 2017, the disclosure of which is hereby incorporated herein by reference.

FIELD OF THE INVENTION

The present invention relates to communication technology, and more particular, to a key point based guiding navigation method, device, and equipment.

BACKGROUND OF THE INVENTION

With the rapid growth of mobile equipment and communication technology and the improvement of the living standard and the user's experience requirement, the demands of mobile communication equipment are growing rapidly and widely. The applications of positioning services based on positioning develop from day to day. Further, the demands for indoor positioning services are growing, for example, large shopping malls guide, underground parking garage and building indoor-positioning. It not only facilitates people's life, but also contains great commercial value, which provides key material for big data mining and its application in commercial activities. Its technological change is playing a greater role for the effectiveness of commercial models.

Currently, conventional positioning applications have indoor navigational function. However, these conventional applications all generate a path plan between an indoor positioning coordinate point and a target position coordinate point, and show the path on a map. So-called indoor navigational method and the outdoor navigational method are generally of the same, and they both show the path to the user in order for the use to follow the same path and reach destination target location. The above prior art techniques suffer from the following drawbacks:

Firstly, there is no specific road in an indoor environment unlike in an outdoor environment, and indeed, the indoor environment is a public region without any roads. In other words, it is not intuitive for the user to use this kind of conventional path planning and rendering manner.

Secondly, some rooms or areas inside an indoor environment may be accessible and accordingly, they can effectively improve moving efficiency of users. However, a prior art navigational path planning fails to take account of above situation and as a result, fails to establish navigational planning and develop a movement path. This does not comply with actual requirement of user movement.

SUMMARY OF THE INVENTION

One object of an embodiment of the invention is to overcome drawbacks as mentioned above and provide a key point based guiding navigation method, device, and equipment.

To realize above object, the following technical solution is proposed.

In one aspect, an embodiment of the invention provides a key point based guiding navigation method, including the following steps:

based on a first location and a second location, determining a plurality of navigation points from among a plurality of key points located in a predetermined indoor map, where the key points are used to represent accessible directions in the indoor map;

generating navigation information for pilot based on orientation of a specific navigation point relative to a current location; and following a predefined displaying rule and based on at least part of the indoor map, displaying the navigation information and navigation point and/or second location.

Preferably, the indoor map used for navigation is obtained by the following steps:

converting an indoor floor plan into image data of a predetermined format;

generating a plurality of constituent elements for constructing the indoor map based on indoor structure represented by the image data, where the constituent elements include regions and key points located on several accessible boundaries among these regions; and constructing the indoor map based on these constituent elements; wherein these regions have a convex planar shape, and the regions containing the accessible boundaries are the accessible regions.

Preferably, the constituent elements further include floors; the regions further include connection regions; and the floors are connected with each other by these connection regions.

Preferably, determination of navigation points from the key points of the predefined indoor map based on a first and second locations includes the following steps:

connecting the first and second locations through the key points to form a plurality of navigation paths;

calculating attribute distance of each navigation path, said attribute distance of each navigation path being obtained by calculation of a physical distance and passability attribute of the same navigation path; and selecting the key points contained in a navigation path having the shortest attribute distance as the navigation points.

Preferably, the navigation points are obtained by following steps:

determining key points adjacent to the first location an obtain a set S{P} of the key points, here, P representing the key points adjacent to the first location;

connecting each key point of the set S{P} to a next adjacent key point until a last key point is connected to the second location so as to obtain a plurality of navigation paths running from each key point to the second location, all the key points contained in a respective navigation path being a subset P{M} of the set S{P};

calculating the attribute distance of corresponding navigation paths of the subset P{M}, said attribute distance of each navigation path being obtained by calculation of a physical distance and passability attribute of the same navigation path; and selecting the key points contained in a navigation path having the shortest attribute distance of the subset P{M} as the navigation points.

A physical distance of the navigation path includes straight distances between various sub-paths of the navigation path; and/or the passability attribute of the navigation path includes predefined passability parameters of a region in which various sub-paths locate; the sub-paths of the navigation path include lines each connects two adjacent nodes together within the same navigation path; and the nodes include the first location, key points, and second location.

Preferably, the attribute distance of the navigation path is a sum of multiplications of respective passability parameters corresponding to specific sub-paths by respective straight distances.

Preferably, the navigation points are displayed in a sequence same as the sequence in which the key points are arranged in a navigation path having the shortest attribute distance.

Preferably, the navigation information for pilot is generated based on orientation of a specific navigation point relative to a current location, and this process of generation includes the following steps:

generating navigation information indicating a direction from the current location to the next navigation based on orientation of a next navigation point relative to the current location, said the next navigation point being closest to the current location.

The predefined displaying rule includes displaying the navigation information at a predefined location in a line connecting the current location and said next navigation point.

The predefined displaying rule further includes: when it is determined that the distance between the current location and a next navigation point is shorter than a predefined distance, the navigation information is updated to indicate a direction pointing to a further next navigation point of the next navigation point from the current location.

Preferably, the predefined displaying rule further includes:

based on distance between the current location and said next navigation point and relative orientation, determining whether the current location is deviated from the navigation path;

when it is determined that the current location is deviated from the path, taking the current location as a first location and a new navigation path and corresponding navigation points being recalculated; and when it is determined that the newly generated navigation path has an attribute distance shorter than the original navigation path, updating corresponding navigation points and navigation information in view of the newly generated path.

The predefined displaying rule further includes displaying adaptively the navigation information and navigation points and/or second location in at least part of the indoor map based on display screen parameter of a terminal and/or a predefined map ratio.

Another aspect of various embodiments of the invention relates to a key point based guiding navigation device, which includes:

a navigation point analysis unit for determination of navigation points from a plurality of key points shown in an indoor map based on a first and second locations, said key points representing accessible directions in the indoor map;

a navigation generation unit for generating navigation information for pilot based on orientation of a specific navigation point relative to a current location; and a navigation display unit for displaying the navigation information and navigation point and/or second location following a predefined displaying rule and based on at least part of the indoor map.

Preferably, the device further includes a map construction unit for:

converting an indoor floor plan into image data of a predetermined format;

generating a plurality of constituent elements for constructing the indoor map based on indoor structure represented by the image data, where the constituent elements include regions and key points located on several accessible boundaries among these regions;

constructing the indoor map based on these constituent elements; here, these regions have a convex planar shape, and the regions containing the accessible boundaries are the accessible regions.

The constituent elements further include floors; the regions further include connection regions; and the floors are connected with each other by these connection regions.

the navigation point analysis unit determines the navigation points from a plurality of key points shown in an indoor map based on a first and second locations and includes:

connecting the first and second locations through the key points to form a plurality of navigation paths;

calculating attribute distance of each navigation path, said attribute distance of each navigation path being obtained by calculation of a physical distance and passability attribute of the same navigation path; and selecting the key points contained in a navigation path having the shortest attribute distance as the navigation points.

Preferably, the navigation point analysis unit determines the navigation points from a plurality of key points shown in an indoor map based on a first and second locations and includes:

determining key points adjacent to the first location an obtain a set $S\{P\}$ of the key points, here, P representing the key points adjacent to the first location;

connecting each key point of the set $S\{P\}$ to a next adjacent key point until a last key point is connected to the second location so as to obtain a plurality of navigation paths running from each key point to the second location, all the key points contained in a respective navigation path being a subset $P\{M\}$ of the set $S\{P\}$;

calculating the attribute distance of corresponding navigation paths of the subset $P\{M\}$, said attribute distance of each navigation path being obtained by calculation of a physical distance and passability attribute of the same navigation path; and selecting the key points contained in a navigation path having the shortest attribute distance of the subset $P\{M\}$ as the navigation points.

A physical distance of the navigation path includes straight distances between various sub-paths of the navigation path; and/or the passability attribute of the navigation path includes predefined passability parameters of a region in which various sub-paths locate; the sub-paths of the navigation path include lines each connects two adjacent nodes together within the same navigation path; and the nodes include the first location, key points, and second location.

The attribute distance of the navigation path is a sum of multiplications of respective passability parameters corresponding to specific sub-paths by respective straight distances.

The navigation points are displayed by the navigation display unit in a sequence same as the sequence in which the key points are arranged in a navigation path having the shortest attribute distance.

Preferably, the navigation information for pilot is generated based on orientation of a specific navigation point relative to a current location, and this process of generation includes the following steps:

generating navigation information indicating a direction from the current location to the next navigation based on orientation of a next navigation point relative to the current location, said the next navigation point being closest to the current location.

The predefined displaying rule of the navigation display unit includes displaying the navigation information at a predefined location in a line connecting the current location and said next navigation point.

The predefined displaying rule of the navigation display unit includes: when it is determined that the distance between the current location and a next navigation point is shorter than a predefined distance, the navigation information is updated to indicate a direction pointing to a further next navigation point of the next navigation point from the current location.

The predefined displaying rule of the navigation display unit includes:

based on distance between the current location and said next navigation point and relative orientation, determining whether the current location is deviated from the navigation path;

when it is determined that the current location is deviated from the path, taking the current location as a first location and a new navigation path and corresponding navigation points being recalculated; and when it is determined that the newly generated navigation path has an attribute distance shorter than the original navigation path, updating corresponding navigation points and navigation information in view of the newly generated path.

Preferably, the predefined displaying rule of the navigation display unit includes:

displaying adaptively the navigation information and navigation points and/or second location in at least part of the indoor map based on display screen parameter of a terminal and/or a predefined map ratio.

According to a further aspect, an equipment is proposed which includes a display screen, a memory for storing information including program instructions and one or more processors for controlling execution of the program instructions; and when the processors run the instructions, all the steps of the key point based guiding navigation method as described above are performed.

Compared to prior art, various embodiments of the invention bring the following technical effects.

At first, according the key point based guiding navigation method, device, and equipment, it is possible to analyze the relationship among the first and second locations and key points representing accessible regions of an indoor map, and then find out navigation points from the key points. Next, navigation information may be produced based on relative orientation between the current location (the first location) and said navigation points. As a result, the navigation information and navigation points and/or second location may be shown in at least part of the indoor map following a predefined displaying rule. This effectively provides indoor navigation to the user and improves pass efficiency.

Secondly, in various embodiments of the invention, an indoor floor plan is converted into image data of a predetermined format. A plurality of constituent elements for constructing the indoor map are generated based on indoor structure represented by the image data, where the constituent elements may include regions and key points located on several accessible boundaries among these regions. The indoor map is then constructed based on these constituent elements. These regions may have a convex planar shape, and the regions containing the accessible boundaries are the accessible regions. Therefore, the above process effectively accomplishes the construction of the structured indoor map used for indoor navigation, making the indoor navigation more efficient and convenient.

Finally, various embodiments of the invention are also capable of handling abnormal situations. Based on distance between the current location and said next navigation point and relative orientation, it determines whether the current location is deviated from the navigation path; when it is determined that the current location is deviated from the path, then the current location is taken as a first location and a new navigation path and corresponding navigation points are recalculated; and when it is determined that the newly generated navigation path has an attribute distance shorter than the original navigation path, update corresponding navigation points and navigation information in view of the newly generated path. this makes the entire navigation process more human kindly and also improves user experience.

Clearly, the forgoing description of various aspects of the embodiments of the invention is only for illustrative. More aspects are described in embodiments hereinafter.

BRIEF DESCRIPTION OF THE DRAWINGS

The above and/or additional aspects and advantages of the present invention will become apparent and readily appreciated from the following description of embodiments taken with reference to the accompanying drawings, in which.

DETAILED DESCRIPTION OF THE INVENTION

Figure 1:
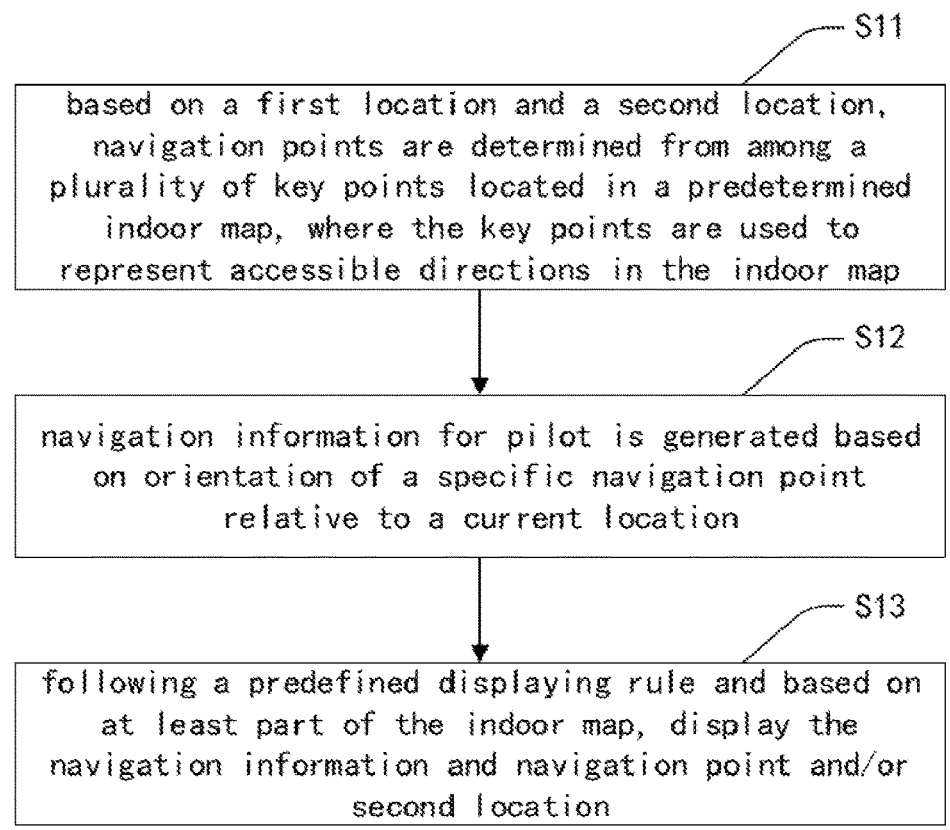
FIG. 1 shows a flowchart of a key point based guiding navigation method in accordance with one embodiment of the invention.

Embodiments of the present invention will be described now in detail hereinafter. The examples of these embodiments have been illustrated in the drawings.

In some processes, which will be described in specification, claims and above drawings of current application, multiple operations have been included. However, it should be understood that these operations may also be performed in other different order or concurrently. Numerals such as S11 and S12 representing corresponding operations are only used for distinguishing among these operations and no specific operating sequence is intended. In addition, these processes may also include less or more operations, and they can be conducted in sequence or concurrently. It should be noted that terms such as "first" and "second" are for representing different messages, devices, or modules and no specific sequence is intended. They are also not intended for representing different types of items.

It should be understood by a person skilled in this art that singular forms "a", "an", "the", and "said" can be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it may be directly connected or coupled to other elements or provided with intervening elements there between. In addition, "connected to" or "coupled to" as used herein can include wireless connection or coupling. As used herein, term "and/or" includes all units, any unit, or all combination of one or more associated listed items.

It should be understood by a person skilled in this art that, unless otherwise defined, all terms (including technical and scientific terms) used herein have the same meaning as commonly understood by one person of ordinary skill in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person skilled in this art that term "terminal" and "terminal apparatus" as used herein comprise not only devices with a wireless signal receiver having no emission capability but also devices with receiving and emitting hardware capable of carrying out bidirectional communication over a bidirectional communication link. The "terminal" as used herein may include but is not limited to cellular or other communications devices with a single- or multiple-lined display, such as smart phone, smart tablet, or other smart device with other kind of display function.

Embodiments of the present invention will be described in detail hereinafter. The examples of these embodiments have been illustrated in the drawings throughout which same or similar reference numerals refer to same or similar elements or elements having same or similar functions. The embodiments described with reference to the drawings are illustrative, merely used for explaining the present invention and should not be regarded as any limitations thereto.

In the era of mobile internet communications, the indoor navigation technique as presented in various embodiments of the invention has good prospect. It can find its application in supermarkets, underground parking lots, exhibition halls, gymnasiums, beauty spots, or even in emergencies, and accordingly, it has great social and economic values.

Referring to FIG. 1, there is illustrated a key point based guiding navigation method, which includes the following steps S11-S13.

In step S11, based on a first location and a second location, navigation points are determined from among a plurality of key points located in a predetermined indoor map, where the key points are used to represent accessible directions in the indoor map.

In one embodiment, the first position and/or a current position are obtained using an indoor positioning technology. The indoor positioning technology may include one or more of Wi-Fi positioning technology, Bluetooth positioning technology, RFID positioning technology, Zigbee positioning technology, Super-bandwidth positioning technology, and geomagnetic positioning technology. In general, indoor positioning refers to the use of indoor positioning technology as an auxiliary of satellite positioning in case that the satellite positioning is unavailable or difficult to use, thereby solving the problem of the satellite signal becoming weak as it reaches the ground as well as the difficulty for the satellite signal to penetrate buildings, and so positioning the current position of the object. The indoor positioning method applicable to the embodiments of current invention may include without any limitation: triangular positioning method, fingerprint-positioning method, LED light positioning method, and hybrid positioning method.

Figure 2:
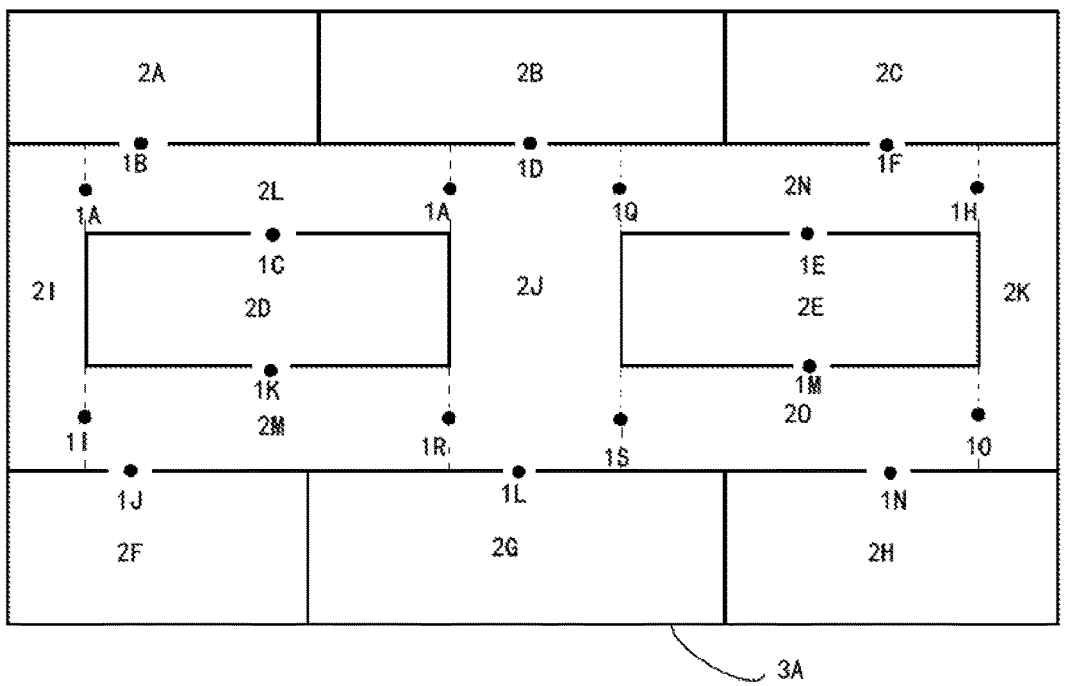
FIG. 2 shows a process of construction of an indoor map in accordance with one embodiment of the invention.

Referring now to FIG. 2, in one embodiment, the above indoor map used for navigation may be obtained by the following steps. An indoor floor plan is converted into image data of a predetermined format. A plurality of constituent elements for constructing the indoor map are generated based on indoor structure represented by the image data, where the constituent elements may include regions and key points located on several accessible boundaries among these regions. The indoor map is then constructed based on these constituent elements. These regions may have a convex planar shape, and the regions containing the accessible boundaries are the accessible regions. Therefore, the above process effectively accomplishes the construction of the structured indoor map used for indoor navigation, making the indoor navigation more efficient and convenient.

The indoor map is constructed mainly based on the key points and regions, by which the accessible portions in the map are divided into one or more accessible regions. At least one key point is set on an accessible boundary between accessible regions. In other words, the key points can be used to depict the accessible regions in the indoor map. The key points can be used to represent the accessible directions in the indoor map based on the relative positional relations among different key points, or between a key point and a current/first/second position.

Figure 3:
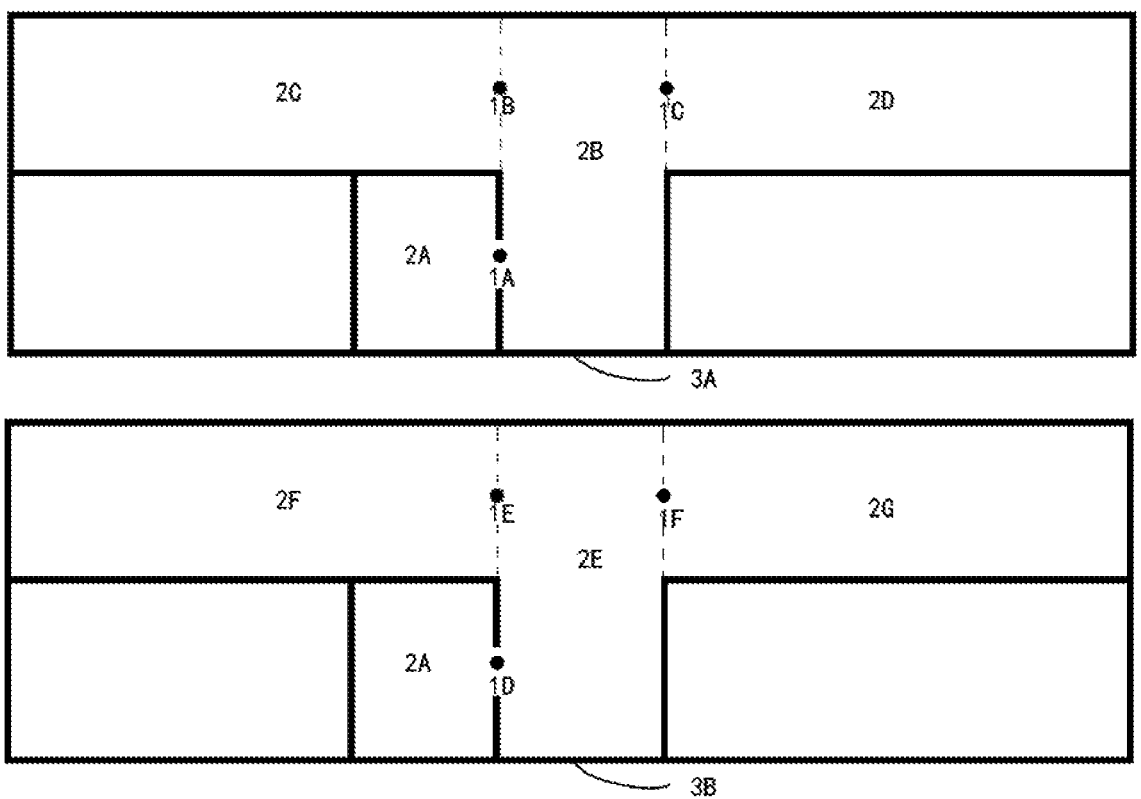
FIG. 3 shows a process of construction of an indoor map in accordance with one embodiment of the invention.
Figure 4:
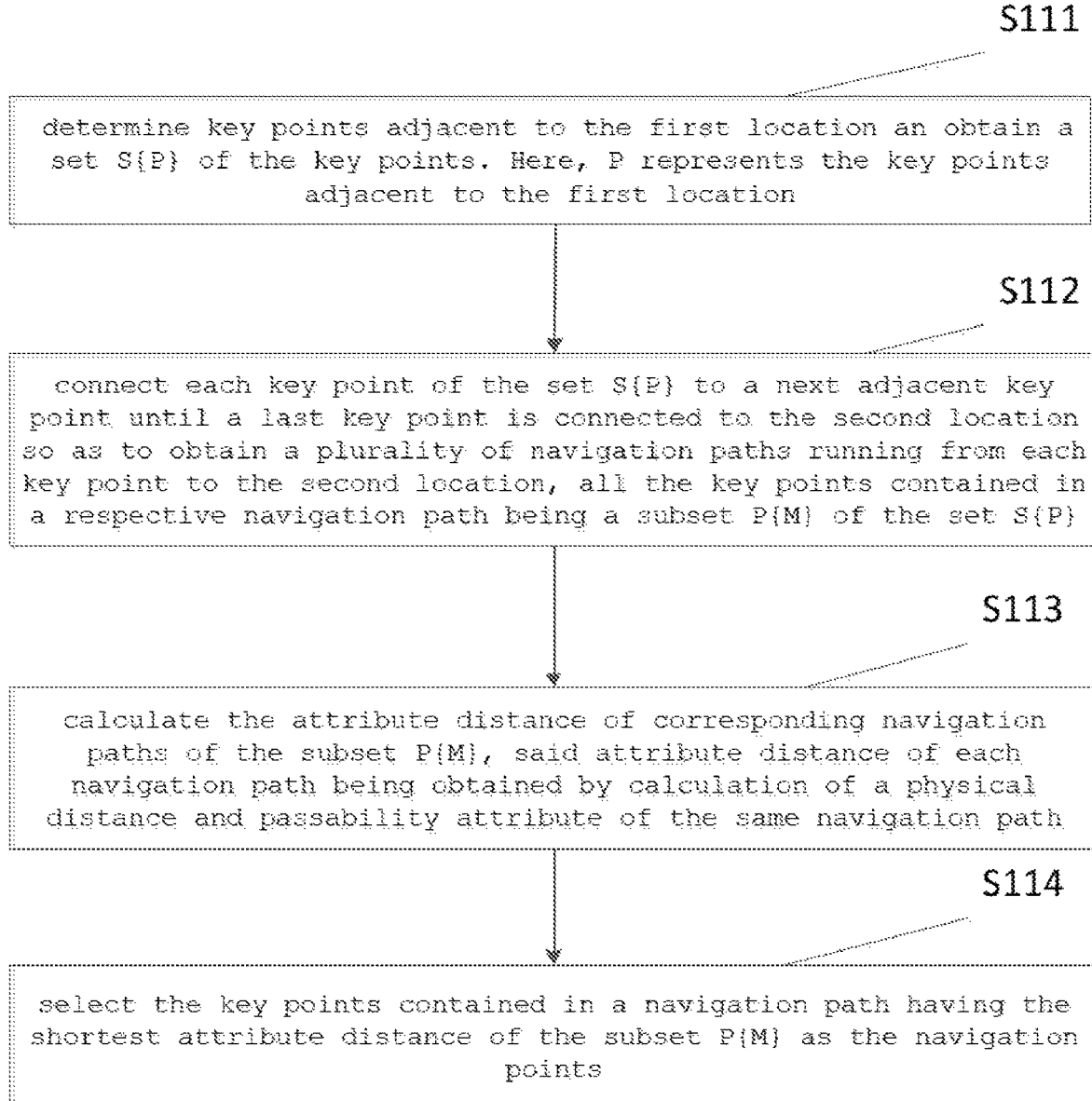
FIG. 4 shows a flowchart illustrating determination of navigation point in accordance with one embodiment of the invention.

Based on above description, referring now to FIG. 3, considering that modern buildings are usually multi-storey buildings, the aforementioned constituent elements may further include floors. The indoor map of a particular floor of a multi-storey building is associated with a corresponding floor. On one hand, each floor can be regarded as a relatively independent and complete navigational section constructed of several regions and/or key points. On the other hand, the regions may further include connection regions, and the floors are connected with each other by these connection regions. This enables the expansion of the indoor navigation among various floors, making the embodiments of the invention more convenient and practical.

In particular, a specific indoor map of a corresponding floor can be divided into several regions, with each region being defined by accessible regions and/or inaccessible boundaries. Typically, the above-described regions may include indoor elements such as rooms and passageways present in the indoor map. It should be noted that for ease of division and navigation, all regions will be constructed as convex. In addition, there may exist a special type of region called connection region. These connection regions are for connecting together floors and they typically represent the indoor elements, such as vertical ladders, stairs, elevators, in the indoor map.

The aforementioned key points are generally accessible connection points among the regions. There are many key points on the accessible boundaries among the regions. In an embodiment of the invention, at least one point at a suitable location may be selected as a key point for forming an indoor map. The key points may be deemed as entrances and exits of the regions. In other words, the indoor key points may be suitably accessible locations inside an indoor environment. These key points in an indoor map generally may include locations where two passageways join, where two passageways separate from each other, door location of rooms, entrance of stairs, escalator entrances, and lift entrances. Of course, it should be understood from above description that key points of an indoor region are accessible to each other.

It is clear from above description that each floor may be constructed of regions and key points. The floors are connected with each other through connection regions. The relationship among the regions may be defined by the key points. In other words, the regions sharing a common key point are accessible one another.

Generally there is hierarchy among these floors, regions, and key points, the regions being defined by key points, and floors being defined by the regions. It is clear that the key points may be shared by multiple regions. Referring to FIG. 2, a key point 1B belongs to a region 2A representing a room, and the region 2A crosses with a region 2L representing a passageway. That is to say, the key point 1B also belongs to the region 2L. A connection region 2 does not belong to any one of floors 3. Referring to FIG. 3, the floors 3A and 3B are accessible through the connection region 2A. In other words, the region 2A representing a lift is a connection region 2 of the floors 3A and 3B. Of course, in some embodiments, there may be no region 2 in the floor 3. In addition, there may be no key point 1 in the region 2, meaning that the region 2 is an inaccessible enclosed region. Accordingly, accessible regions 2 in an indoor map may be defined by the regions 2 and, connective relationship among these regions 2 in the indoor map may be determined by combination of key points 1. By this way, the indoor map is generated by the key points 1 and regions 2 for realizing a key point based guiding navigation method.

In some embodiments, construction of an indoor map may be conducted by transforming profile data such as floors, rooms, doors and stairs of an indoor area of a CAD drawing into data with format of .shp by geographical information processing software such as ArcMa. Then, incorrectly transformed data is repaired in a vectorization manner. After that, the transformed data is further transformed into linear elements for forming constituent element of the indoor map such as floors, regions, and key points. By this way, the key points may be used to represent accessible indoor regions. Furthermore, constituent elements including floors, regions, and key points may be constructed by primarily generated linear elements in the indoor map. The linear elements may function as important part of region elements. In other words, a region is defined by a number of linear elements. Moreover, a linear element may also serve as the boundary of regions. The boundary may include accessible and inaccessible boundaries. In general, a region has one or more accessible boundaries indicating that the same region is accessible. An intersection location between two regions may be defined as a point element. The point element of an indoor map is defined by intersection of accessible boundaries between two regions. For example, when a room and a passageway intersect, a boundary common to the room and passageway may be an accessible boundary. In this case, the intersection location may be deemed as a key point. A floor represents a specific layer of an indoor building, and is defined by a plurality of regions and key points. Adjacent floors are connected by a connection region such as elevator, stair.

Generally, the indoor map may be in advance temporarily stored into for example a local storage, or may be obtained through a remote interface when performing a key point based guiding navigation method. For instance, in an embodiment, the indoor map may provide service to an external client such as a device by a map unit and in form of Web service (WebGis). The service unit may be a thick server, and the client may be a thin client. It means that the server handles transaction and business logic, while the client sends request for obtaining and displaying corresponding map data. For instance, a device sends a predefined HTTP request to a Web server, a service unit returns corresponding data based on the request, and then the device obtains the data from the Web server and displays or processes corresponding navigation contents.

To realize navigation using the indoor map, navigation points should also be determined from the key points of the map. In an embodiment, determination of navigation points from the key points of the predefined indoor map based on a first and second locations includes the following steps: connecting the first and second locations through the key points to form a plurality of navigation paths; calculating attribute distance of each navigation path, said attribute distance of each navigation path being obtained by calculation of a physical distance and passability attribute of the same navigation path; and selecting the key points contained in a navigation path having the shortest attribute distance as the navigation points.

In a possible embodiment, the navigation points may be obtained by following steps.

In Step S111, determine key points adjacent to the first location an obtain a set S{P} of the key points. Here, P represents the key points adjacent to the first location.

In Step S112, connect each key point of the set S{P} to a next adjacent key point until a last key point is connected to the second location so as to obtain a plurality of navigation paths running from each key point to the second location, all the key points contained in a respective navigation path being a subset P{M} of the set S{P}.

For example, traversal method may be employed to obtain the plurality of navigation paths form the first location to the second location, and in turn, all the key points between the first and second locations are obtained as well.

In Step S113, calculate the attribute distance of corresponding navigation paths of the subset P{M}, said attribute distance of each navigation path being obtained by calculation of a physical distance and passability attribute of the same navigation path.

In Step S114, select the key points contained in a navigation path having the shortest attribute distance of the subset P{M} as the navigation points.

To reduce computation required to get the navigation points, prior to the Step S112, a further step may be included. This further step S1112 includes finding and deleting key points of the set S{P} which fail to being connected to the second location.

For example, when a specific key point in the set S{P} tries to connect to other points, ultimately it fails to be connected to the second location. In this situation, this key point is regarded as an invalid element of the set S{P}. This key point does not meet navigation condition, and accordingly is removed from the set. The set S{P} after removal of invalid points serves for subsequent operation.

Assume all the valid navigation points constitute a set T{N}. The navigation points of the set T{N} may be arranged following this rule: a navigation point closest to the first location is set as a starting point; and, in other words, T{N1} is closest to the first location, while T{Nn} is furthest away from the first location and also closest to the second location. The navigation points may be displayed in the manner same to arrangement order of the navigation points in the set T{N}.

Figure 5:
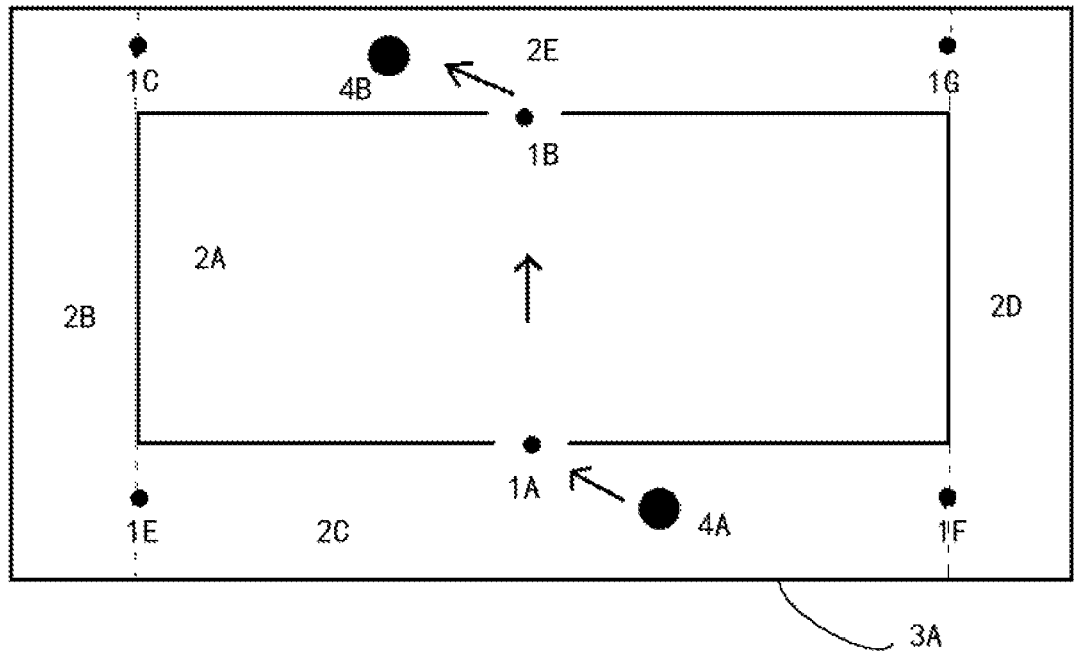
FIG. 5 schematically denotes a chart illustrating guiding navigation in accordance with one embodiment of the invention.
Figure 6:
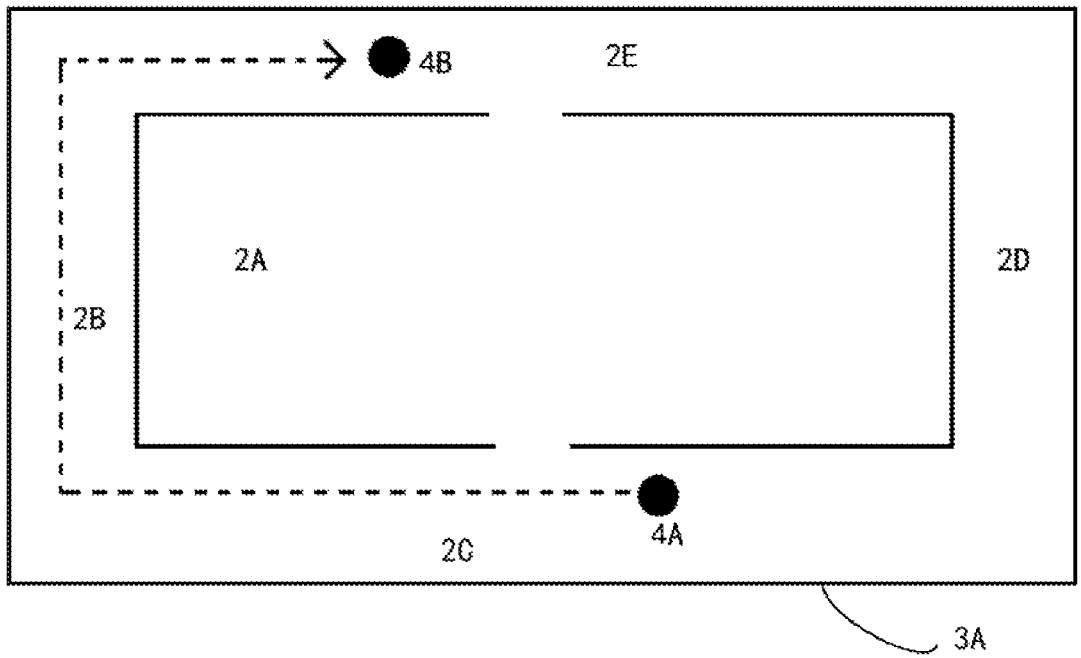
FIG. 6 shows a schematic view of prior art path-planning based navigation.

In an embodiment to providing navigation service to the user and as shown in FIG. 5, assume a region 2 indicating a room exists between a first location 4A and a second location 4B, and the region 2 is accessible if a plurality of key points 1 are present in it. In one situation, only a region 2A is between the first location 4A and second location 4B, and the region 2A has a key point 1A close to the first location 4A and another key point 1B close to the second location 4B. In this case, the key points 1A and 1B can be used as navigation points 1A and 1B respectively. Accordingly, the user is able to get to the second location 4B from the first location 4A through the region 2A. In other words, the user walks through the navigation point 1A and then through the point 1B, hence getting to the second location 4B with the shortest distance, and avoiding walking a longer way and taking more time in his process of finding a way to the second location 4B without going through the region 2A. Please refer to FIGS. 5 and 6 in which, FIG. 5 illustrates a shorter distance to the second location 4B passing through the room region 2A with the help of navigation points, thus improving accessibility efficiency, while FIG. 6 shows a longer distance to the second location 4B not passing through the room region 2A due to lack of a navigation point-assisted map plan.

In an embodiment of the invention, a set of key points is taken as a set of navigation points, where these key points are associated with a navigation path having a shortest attribute distance from the first location to the second location. There may exist many possible navigation paths from the first location to the second location and accordingly there may exist many corresponding sets of key points. Based on connectivity between two key points, some key points enable be connected to the second location, but attribute distances associated with these enabling key points respectively may have some difference among them. As a result, sets of key points with shortest attribute distances may be selected and defined as optimum sets of navigation points. Specifically, the sum of attribute distances of all key points contained a respective set is taken as an attribute distance of the same set of the key points. The attribute distances of these sets are compared with each other to find a set of key points with the shortest attribute distance and take it as the optimum set of navigation points from the first location to the second location.

Based on above principle, suppose that the first and second locations are in different floors and in this situation, key points, which locate at the same floor with the first location and accessible to another floor into which the second location lies, are calculated. Corresponding key points located at the same floor with the second location and accessible to the second location are calculated as well. Alternatively, following above-mentioned method, navigation points from the first location to the second location are determined. As such, highly effective navigation through different floors is realized.

Furthermore, a physical distance of the above mentioned navigation path includes straight distances between various sub-paths of the navigation path. The passability attribute of the navigation path includes predefined passability parameters of a region in which various sub-paths locate. For instance, passability parameter of a region representing a passageway is larger than that of another region representing a store. For further instance, passability parameter of a region with lower density of population is larger than that of another region with higher density of population. Here, the sub-paths of the navigation path include lines each connects two adjacent nodes together within the same navigation path. The nodes include the first location, key points, and second location, all of which have been mentioned before. Specifically, the attribute distance of the navigation path is a sum of multiplications of respective passability parameters corresponding to specific sub-paths by respective straight distances.

In step S12, navigation information for pilot is generated based on orientation of a specific navigation point relative to a current location.

In one embodiment of the invention, the user is provided with a moving direction illustrated as from the current location towards a next navigation point. Alternatively, the navigation information may be displayed at a predefined location in a line connecting the current location and next navigation point together such as at a middle location of the line. The information may take the form of a navigation icon, color, or text. In an embodiment of the invention, the navigation information for pilot is generated based on orientation of a specific navigation point relative to a current location, and this process of generation may include the following steps.

Based on orientation of a next navigation point relative to the current location, generate navigation information indicating a direction from the current location to the next navigation, said the next navigation point being closest to the current location.

As mentioned above, current location of the user may be obtained with the help of positioning technology especially indoor positioning technique. Accordingly, orientation of a next navigation point with respect to the current location is also obtained. Moreover, in some embodiments, they can also be obtained through a corresponding sensor installed in a terminal held by the user.

In step S13, following a predefined displaying rule and based on at least part of the indoor map, display the navigation information and navigation point and/or second location.

After determining the navigation point and information, in some embodiments of the invention, the navigation information and navigation point and/or second location are displayed on the indoor map following the predefine displaying rule in order to provide navigation to the user. In an embodiment, specifically, based on coordinates of an indoor location of the user and that of a next adjacent navigation point, corresponding navigation information is displayed at a predefined location in a line connecting the two coordinates together. The navigation information indicates a direction pointing to the next key point.

In another embodiment, the above-mentioned predefined displaying rule includes:

display by a terminal a first location in an indoor map in accordance with indoor positioning technique and method;

after obtaining navigation points of a navigation path based on the second location, display these navigation points in a sequence they are arranged in said path;

display navigation information between the current location and a next navigation point for indicating a direction from the current location to said next navigation point; and update and display the key points when it is determined that the user has arrived at a further next navigation point.

Furthermore, when it is determined that the distance between the current location and a next navigation point is shorter than a predefined distance, it is then also determined that the user has arrived at the next navigation point. In this situation, the navigation information is updated to indicate a direction pointing to a further next navigation point of the next navigation point from the current location. In particularly, in a possible embodiment of the invention, starting from a first location, the navigation information may take the form of direction and be shown between the current location and navigation point T{1} so as to guide the user to a key point. During this period, the navigation information indicating a direction from the current location to the navigation point T{1} may be recalculated and updated periodically. The displaying manner of the navigation information depends on a straight distance from the current location to the key point T{1} and/or size of a terminal screen for showing an indoor map and/or scale ratio of the current indoor map. For example, the navigation information may be displayed at the middle of the straight distance between the current location and navigation point T{1} and the same information indicates a direction towards the coordinate of current navigation point T{1}. When the distance between current location and navigation point T{1} is shorter than a predefined distance, the navigation information is updated to indicate a direction towards a key point T{2} from the current location. This process continues until the distance between the user and a second location is smaller than a predefined distance, and then the navigation process is ended.

It should be noted that in various embodiments of the invention, it is unnecessary to display all navigation points at a time. Rather, it is possible to display only those key points closer to the current location of the user. A next navigation point will be immediately displayed once it is confirmed that the user has reached the navigation point. When the navigation point is T{n} displayed, navigation runs based on the second location to lead the user to the destination.

To improve navigation efficiency and user experience, in some embodiments of the invention, it determines whether the current location of the user coincide with a next navigation point and the answer is yes, then the navigation point is labeled with a prompt information such as "arrived". By this manner, the user is able to know all the navigation points he has passed through and then make further plans. In addition, after the user gets to the destination (second location), display of navigation points and navigation information may be terminated to prompt the user end of the navigation process.

It is understood that in actual navigation process, a user may easily deviate from a planned path. Therefore, the displaying rule in some embodiments may also include: based on distance between the current location and said next navigation point and relative orientation, determine whether the current location is deviated from the navigation path; when it is determined that the current location is deviated from the path, then the current location is taken as a first location and a new navigation path and corresponding navigation points are recalculated; and when it is determined that the newly generated navigation path has an attribute distance shorter than the original navigation path, update corresponding navigation points and navigation information in view of the newly generated path.

A key point based guiding navigation method has been disclosed in various embodiments of the invention. When implementing these embodiments, it is possible to analyze the relationship among the first and second locations and key points representing accessible regions of an indoor map, and then find out navigation points from the key points. Next, navigation information may be produced based on relative orientation between the current location and said navigation points. As a result, the navigation information and navigation points and/or second location may be shown in at least part of the indoor map following a predefined displaying rule. This effectively provides indoor navigation to the user and improves pass efficiency.

Following the same principle and based on aforementioned a key point based guiding navigation method, a key point based guiding navigation device is also proposed.

Figure 7:
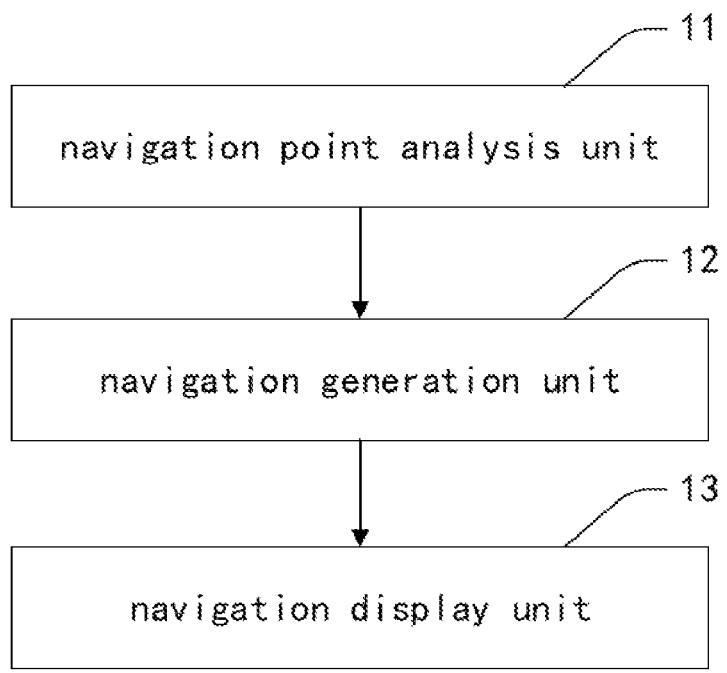
FIG. 7 shows a block structure of a key point based guiding navigation device in accordance with one embodiment of the invention.

Please refer to FIG. 7. A key point based guiding navigation device according to some embodiments of the invention includes a navigation point analysis unit 11, a navigation generation unit 12 and a navigation display unit 13 all of which will be explained as follows.

Said navigation point analysis unit 11 has the function of determination of navigation points from a plurality of key points shown in an indoor map based on a first and second locations. The key points represent accessible directions in the indoor map.

In one embodiment, the first position and/or a current position are obtained using an indoor positioning technology. The indoor positioning technology may include one or more of Wi-Fi positioning technology, Bluetooth positioning technology, RFID positioning technology, Zigbee positioning technology, Super-bandwidth positioning technology, and geomagnetic positioning technology. In general, indoor positioning refers to the use of indoor positioning technology as an auxiliary of satellite positioning in case that the satellite positioning is unavailable or difficult to use, thereby solving the problem of the satellite signal becoming weak as it reaches the ground as well as the difficulty for the satellite signal to penetrate buildings, and so positioning the current position of the object. The indoor positioning method applicable to the embodiments of current invention may include without any limitation: triangular positioning method, fingerprint-positioning method, LED light positioning method, and hybrid positioning method.

Referring now to FIG. 2, in one embodiment, the above indoor map used for navigation may be obtained by the following steps. An indoor floor plan is converted into image data of a predetermined format. A plurality of constituent elements for constructing the indoor map are generated based on indoor structure represented by the image data, where the constituent elements may include regions and key points located on several accessible boundaries among these regions. The indoor map is then constructed based on these constituent elements. These regions may have a convex planar shape, and the regions containing the accessible boundaries are the accessible regions. Therefore, the above process effectively accomplishes the construction of the structured indoor map used for indoor navigation, making the indoor navigation more efficient and convenient.

The indoor map is constructed mainly based on the key points and regions, by which the accessible portions in the map are divided into one or more accessible regions. At least one key point is set on an accessible boundary between accessible regions. In other words, the key points can be used to depict the accessible regions in the indoor map. The key points can be used to represent the accessible directions in the indoor map based on the relative positional relations among different key points, or between a key point and a current/first/second position.

Based on above description, referring now to FIG. 3, considering that modern buildings are usually multi-storey buildings, the aforementioned constituent elements may further include floors. The indoor map of a particular floor of a multi-storey building is associated with a corresponding floor. On one hand, each floor can be regarded as a relatively independent and complete navigational section constructed of several regions and/or key points. On the other hand, the regions may further include connection regions, and the floors are connected with each other by these connection regions. This enables the expansion of the indoor navigation among various floors, making the embodiments of the invention more convenient and practical.

In particular, a specific indoor map of a corresponding floor can be divided into several regions, with each region being defined by accessible regions and/or inaccessible boundaries. Typically, the above-described regions may include indoor elements such as rooms and passageways present in the indoor map. It should be noted that for ease of division and navigation, all regions will be constructed as convex. In addition, there may exist a special type of region called connection region. These connection regions are for connecting together floors and they typically represent the indoor elements, such as vertical ladders, stairs, elevators, in the indoor map.

The aforementioned key points are generally accessible connection points among the regions. There are many key points on the accessible boundaries among the regions. In an embodiment of the invention, at least one point at a suitable location may be selected as a key point for forming an indoor map. The key points may be deemed as entrances and exits of the regions. In other words, the indoor key points may be suitably accessible locations inside an indoor environment. These key points in an indoor map generally may include locations where two passageways join, where two passageways separate from each other, door location of rooms, entrance of stairs, escalator entrances, and lift entrances. Of course, it should be understood from above description that key points of an indoor region are accessible to each other.

It is clear from above description that each floor may be constructed of regions and key points. The floors are connected with each other through connection regions. The relationship among the regions may be defined by the key points. In other words, the regions sharing a common key point are accessible one another.

Generally there is hierarchy among these floors, regions, and key points, the regions being defined by key points, and floors being defined by the regions. It is clear that the key points may be shared by multiple regions. Referring to FIG. 2, a key point 1B belongs to a region 2A representing a room, and the region 2A crosses with a region 2L representing a passageway. That is to say, the key point 1B also belongs to the region 2L. A connection region 2 does not belong to any one of floors 3. Referring to FIG. 3, the floors 3A and 3B are accessible through the connection region 2A. In other words, the region 2A representing a lift is a connection region 2 of the floors 3A and 3B. Of course, in some embodiments, there may be no region 2 in the floor 3. In addition, there may be no key point 1 in the region 2, meaning that the region 2 is an inaccessible enclosed region. Accordingly, accessible regions 2 in an indoor map may be defined by the regions 2 and, connective relationship among these regions 2 in the indoor map may be determined by combination of key points 1. By this way, the indoor map is generated by the key points 1 and regions 2 for realizing a key point based guiding navigation device.

In some embodiments, construction of an indoor map may be conducted by transforming profile data such as floors, rooms, doors and stairs of an indoor area of a CAD drawing into data with format of .shp by geographical information processing software such as ArcMa. Then, incorrectly transformed data is repaired in a vectorization manner. After that, the transformed data is further transformed into linear elements for forming constituent element of the indoor map such as floors, regions, and key points. By this way, the key points may be used to represent accessible indoor regions. Furthermore, constituent elements including floors, regions, and key points may be constructed by primarily generated linear elements in the indoor map. The linear elements may function as important part of region elements. In other words, a region is defined by a number of linear elements. Moreover, a linear element may also serve as the boundary of regions. The boundary may include accessible and inaccessible boundaries. In general, a region has one or more accessible boundaries indicating that the same region is accessible. An intersection location between two regions may be defined as a point element. The point element of an indoor map is defined by intersection of accessible boundaries between two regions. For example, when a room and a passageway intersect, a boundary common to the room and passageway may be an accessible boundary. In this case, the intersection location may be deemed as a key point. A floor represents a specific layer of an indoor building, and is defined by a plurality of regions and key points. Adjacent floors are connected by a connection region such as elevator, stair.

Generally, the indoor map may be in advance temporarily stored into for example a local storage, or may be obtained through a remote interface when performing a key point based guiding navigation method. For instance, in an embodiment, the indoor map may provide service to an external client such as a device by a map unit and in form of Web service (WebGis). The service unit may be a thick server, and the client may be a thin client. It means that the server handles transaction and business logic, while the client sends request for obtaining and displaying corresponding map data. For instance, a device sends a predefined HTTP request to a Web server, a service unit returns corresponding data based on the request, and then the device obtains the data from the Web server and displays or processes corresponding navigation contents.

To realize navigation using the indoor map, navigation points should also be determined from the key points of the map. In an embodiment, determination of navigation points from the key points of the predefined indoor map based on a first and second locations includes the following steps: connecting the first and second locations through the key points to form a plurality of navigation paths; calculating attribute distance of each navigation path, said attribute distance of each navigation path being obtained by calculation of a physical distance and passability attribute of the same navigation path; and selecting the key points contained in a navigation path having the shortest attribute distance as the navigation points.

In a possible embodiment, the navigation points may be obtained by following steps.

determine key points adjacent to the first location an obtain a set S{P} of the key points, here, P representing the key points adjacent to the first location; connect each key point of the set S{P} to a next adjacent key point until a last key point is connected to the second location so as to obtain a plurality of navigation paths running from each key point to the second location, all the key points contained in a respective navigation path being a subset P{M} of the set S{P}; calculate the attribute distance of corresponding navigation paths of the subset P{M}, said attribute distance of each navigation path being obtained by calculation of a physical distance and passability attribute of the same navigation path; and select the key points contained in a navigation path having the shortest attribute distance of the subset P{M} as the navigation points.

For example, traversal method may be employed to obtain the plurality of navigation paths form the first location to the second location, and in turn, all the key points between the first and second locations are obtained as well.

To reduce computation required to get the navigation points, prior to the Step S112, a further step may be included. This further step S1112 includes finding and deleting key points of the set S{P} which fail to being connected to the second location.

For example, when a specific key point in the set S{P} tries to connect to other points, ultimately it fails to be connected to the second location. In this situation, this key point is regarded as an invalid element of the set S{P}. This key point does not meet navigation condition, and accordingly is removed from the set. The set S{P} after removal of invalid points serves for subsequent operation.

Assume all the valid navigation points constitute a set T{N}. The navigation points of the set T{N} may be arranged following this rule: a navigation point closest to the first location is set as a starting point; and, in other words, T{N1} is closest to the first location, while T{Nn} is furthest away from the first location and also closest to the second location. The navigation points may be displayed in the manner same to arrangement order of the navigation points in the set T{N}.

In an embodiment to providing navigation service to the user and as shown in FIG. 5, assume a region 2 indicating a room exists between a first location 4A and a second location 4B, and the region 2 is accessible if a plurality of key points 1 are present in it. In one situation, only a region 2A is between the first location 4A and second location 4B, and the region 2A has a key point 1A close to the first location 4A and another key point 1B close to the second location 4B. In this case, the key points 1A and 1B can be used as navigation points 1A and 1B respectively. Accordingly, the user is able to get to the second location 4B from the first location 4A through the region 2A. In other words, the user walks through the navigation point 1A and then through the point 1B, hence getting to the second location 4B with the shortest distance, and avoiding walking a longer way and taking more time in his process of finding a way to the second location 4B without going through the region 2A. Please refer to FIGS. 5 and 6 in which, FIG. 5 illustrates a shorter distance to the second location 4B passing through the room region 2A with the help of navigation points, thus improving accessibility efficiency, while FIG. 6 shows a longer distance to the second location 4B not passing through the room region 2A due to lack of a navigation point-assisted map plan.

In an embodiment of the invention, a set of key points is taken as a set of navigation points, where these key points are associated with a navigation path having a shortest attribute distance from the first location to the second location. There may exist many possible navigation paths from the first location to the second location and accordingly there may exist many corresponding sets of key points. Based on connectivity between two key points, some key points enable be connected to the second location, but attribute distances associated with these enabling key points respectively may have some difference among them. As a result, sets of key points with shortest attribute distances may be selected and defined as optimum sets of navigation points. Specifically, the sum of attribute distances of all key points contained a respective set is taken as an attribute distance of the same set of the key points. The attribute distances of these sets are compared with each other to find a set of key points with the shortest attribute distance and take it as the optimum set of navigation points from the first location to the second location.

Based on above principle, suppose that the first and second locations are in different floors and in this situation, key points, which locate at the same floor with the first location and accessible to another floor into which the second location lies, are calculated. Corresponding key points located at the same floor with the second location and accessible to the second location are calculated as well. Alternatively, following above-mentioned method, navigation points from the first location to the second location are determined. As such, highly effective navigation through different floors is realized.

Furthermore, a physical distance of the above mentioned navigation path includes straight distances between various sub-paths of the navigation path. The passability attribute of the navigation path includes predefined passability parameters of a region in which various sub-paths locate. For instance, passability parameter of a region representing a passageway is larger than that of another region representing a store. For further instance, passability parameter of a region with lower density of population is larger than that of another region with higher density of population. Here, the sub-paths of the navigation path include lines each connects two adjacent nodes together within the same navigation path. The nodes include the first location, key points, and second location, all of which have been mentioned before. Specifically, the attribute distance of the navigation path is a sum of multiplications of respective passability parameters corresponding to specific sub-paths by respective straight distances.

The navigation generation unit 12 is for generating navigation information for pilot based on orientation of a specific navigation point relative to a current location.

In one embodiment of the invention, the user is provided with a moving direction illustrated as from the current location towards a next navigation point. Alternatively, the navigation information may be displayed at a predefined location in a line connecting the current location and next navigation point together such as at a middle location of the line. The information may take the form of a navigation icon, color, or text. In an embodiment of the invention, the navigation information for pilot is generated based on orientation of a specific navigation point relative to a current location, and this process of generation may include the following steps.

Based on orientation of a next navigation point relative to the current location, generate navigation information indicating a direction from the current location to the next navigation, said next navigation point being closest to the current location.

As mentioned above, current location of the user may be obtained with the help of positioning technology especially indoor positioning technique. Accordingly, orientation of a next navigation point with respect to the current location is also obtained. Moreover, in some embodiments, they can also be obtained through a corresponding sensor installed in a terminal held by the user.

The navigation display unit 13 is for displaying the navigation information and navigation point and/or second location following a predefined displaying rule and based on at least part of the indoor map.

After determining the navigation point and information, in some embodiments of the invention, the navigation information and navigation point and/or second location are displayed on the indoor map following the predefine displaying rule in order to provide navigation to the user. In an embodiment, specifically, based on coordinates of an indoor location of the user and that of a next adjacent navigation point, corresponding navigation information is displayed at a predefined location in a line connecting the two coordinates together. The navigation information indicates a direction pointing to the next key point.

In another embodiment, the above-mentioned predefined displaying rule includes:

display by a terminal a first location in an indoor map in accordance with indoor positioning technique and method;

after obtaining navigation points of a navigation path based on the second location, display these navigation points in a sequence they are arranged in said path;

display navigation information between the current location and a next navigation point for indicating a direction from the current location to said next navigation point; and update and display the key points when it is determined that the user has arrived at a further next navigation point.

Furthermore, when it is determined that the distance between the current location and a next navigation point is shorter than a predefined distance, it is then also determined that the user has arrived at the next navigation point. In this situation, the navigation information is updated to indicate a direction pointing to a further next navigation point of the next navigation point from the current location. In particularly, in a possible embodiment of the invention, starting from a first location, the navigation information may take the form of direction and be shown between the current location and navigation point T{1} so as to guide the user to a key point. During this period, the navigation information indicating a direction from the current location to the navigation point T{1} may be recalculated and updated periodically. The displaying manner of the navigation information depends on a straight distance from the current location to the key point T{1} and/or size of a terminal screen for showing an indoor map and/or scale ratio of the current indoor map. For example, the navigation information may be displayed at the middle of the straight distance between the current location and navigation point T{1} and the same information indicates a direction towards the coordinate of current navigation point T{1}. When the distance between current location and navigation point T{1} is shorter than a predefined distance, the navigation information is updated to indicate a direction towards a key point T{2} from the current location. This process continues until the distance between the user and a second location is smaller than a predefined distance, and then the navigation process is ended.

It should be noted that in various embodiments of the invention, it is unnecessary to display all navigation points at a time. Rather, it is possible to display only those key points closer to the current location of the user. A next navigation point will be immediately displayed once it is confirmed that the user has reached the navigation point.

When the navigation point is T{n} displayed, navigation runs based on the second location to lead the user to the destination.

To improve navigation efficiency and user experience, in some embodiments of the invention, it determines whether the current location of the user coincide with a next navigation point and the answer is yes, then the navigation point is labeled with a prompt information such as "arrived". By this manner, the user is able to know all the navigation points he has passed through and then make further plans. In addition, after the user gets to the destination (second location), display of navigation points and navigation information may be terminated to prompt the user end of the navigation process.

It is understood that in actual navigation process, a user may easily deviate from a planned path. Therefore, the displaying rule in some embodiments may also include: based on distance between the current location and said next navigation point and relative orientation, determine whether the current location is deviated from the navigation path; when it is determined that the current location is deviated from the path, then the current location is taken as a first location and a new navigation path and corresponding navigation points are recalculated; and when it is determined that the newly generated navigation path has an attribute distance shorter than the original navigation path, update corresponding navigation points and navigation information in view of the newly generated path.

A key point based guiding navigation device has been disclosed in various embodiments of the invention. When implementing these embodiments, it is possible to analyze the relationship among the first and second locations and key points representing accessible regions of an indoor map, and then find out navigation points from the key points. Next, navigation information may be produced based on relative orientation between the current location and said navigation points. As a result, the navigation information and navigation points and/or second location may be shown in at least part of the indoor map following a predefined displaying rule. This effectively provides indoor navigation to the user and improves pass efficiency.

Figure 8:
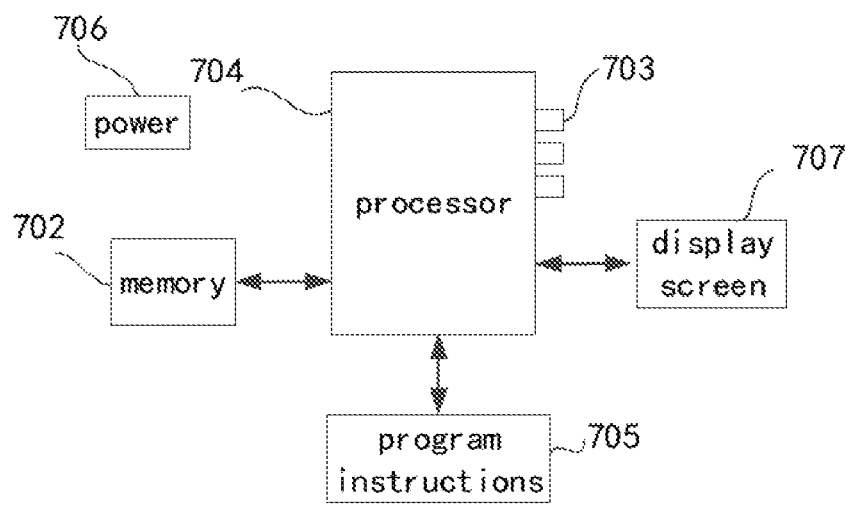
FIG. 8 shows a block diagram of structure of an equipment in accordance with one embodiment of the invention.

Please refer to FIG. 8. Equipment is shown to have a display screen 707, a memory 702 and one or more processors 704. The memory 702 is used for storing information including program instructions 705. The processor 704 is used for controlling execution of the program instructions 705. When the processor 705 runs the instructions 705, all the steps of above mentioned key point based guiding navigation method are performed.

Specifically, the display screen 705 may display information input by the user or information supplied to the user and kinds of menus of a terminal. A display unit may include a display panel. Alternatively, the display panel may be in the form of a Liquid Crystal Display, Organic Light-Emitting Diode or similar. Furthermore, a touch panel may cover the display panel. When touch actions on or near it are detected by the touch panel, these actions will be transmitted to the processor 704 to determine type of the touch action events. Subsequently, based on type of the touch action events, the processor 704 outputs visual signals o the display panel. Though in some embodiments, the touch panel and display panel are two separate and independent components for realizing input and output, in other embodiments, the two components may be integrated as one to realize input and output function of the terminal.

The memory 702 may store applications and modules therein. The processor 704 runs the program instructions 705 stored in the memory 702 to realize various application functions and data processing. The memory 702 may include majorly a program storage section and a data storage section. Here, the program storage section stores an operating system therein and the program instructions 705 for realizing at least one function such as sound playback or video playback. The data storage section stores data created when the terminal operates. Moreover, the memory 702 may include a high speed random access storage section 702 and may also include a non-volatile storage section such as a magnetic disk storage, a flash memory or other volatile solid state memory.

The equipment further includes a communication interface 703 for realizing communication between the device and other devices or communication network during an interactive process. The interface 703 serves to connect the processor 704 with an external sub-system for realizing communication there between and information delivery, thus being able to control the sub-system.

The processor 704 is a control center of the equipment, and it utilizes kinds of communication interfaces 703 and wires to connect each and every component of the equipment. The processor 704 runs or executes the program instructions and/or modules stored into the storage section 702. The processor 704 also invokes data stored into the storage section 702 to perform kinds of functions of the equipment and data processing, thereby realizing total control over the equipment. Optionally, the processor 704 may include one or more processing units. Preferably, the processor 704 may contain application processors and modems therein. Here, the application processor mainly processes the operating system, user interface and program instructions 705, while the modem mainly handles wireless communications. It is understood that the modem may also not be integrated with the processor 704.

One or more program instructions are also included as discussed above. Preferably, these program instructions 705 are stored into the storage section 702 and are configured to be executed by said one or more processors 704. Said one or more program instructions are configured to realize various functions of the key point based guiding navigation method.

In some embodiments of the invention, the processor 704 of the present equipment also brings the following functions:

Determination of navigation points from a plurality of key points shown in an indoor map based on a first and second locations, the key points representing accessible directions in the indoor map;

Generation of navigation information for pilot based on orientation of a specific navigation point relative to a current location; and Display of the navigation information and navigation point and/or second location following a predefined displaying rule and based on at least part of the indoor map.

Various embodiments of the invention also provide computer storage medium for storing a series of computer software instructions used by the equipment. Said instructions include program designed for the equipment.

It would be understood by person of the art that for clarity of description, the detailed operation of above system, device, and unit can be learned with reference to corresponding operation as described above in various embodiments and therefore, further description thereof is omitted.

It is understood that according embodiments of the invention, it is possible to combine the original video stream and animation, hence enhancing effectively video interactive effects during an internet broadcasting process, and improving user experience.

It would be understood by person of the art that full of part of the steps of the method as described in kinds of embodiments can be accomplished by hardware under control of program which may be stored into a computer readable storage medium. Said storage medium may include without limitation any types of disks (floppy disk, hard disk, optical disk, CD-ROM, or magnetic optical disk), ROM (Read-Only Memory), RAM (Random Access Memory), EPROM (Erasable Programmable Read-Only Memory), Flash memory, magnetic card, or optical card.

A key point based guiding navigation method, device, and equipment have been described above.

Though various embodiments of the present invention have been illustrated above, a person of the art will understand that, variations and improvements made upon the illustrative embodiments fall within the scope of the present invention, and the scope of the present invention is only limited by the accompanying claims and their equivalents.

The invention claimed is:

1. A key point based guiding navigation method, comprises the following steps:
    based on a first location and a second location, determining a plurality of navigation points from among a plurality of key points located in a predetermined indoor map, where the key points are used to represent accessible directions in the indoor map;
    generating navigation information for pilot based on orientation of a specific navigation point relative to a current location; and
    following a predefined displaying rule and based on at least part of the indoor map, displaying the navigation information and navigation point and/or second location;
    wherein the indoor map used for navigation is obtained by the following steps:
    converting an indoor floor plan into image data of a predetermined format;
    generating a plurality of constituent elements for constructing the indoor map based on indoor structure represented by the image data, where the constituent elements include regions and key points located on several accessible boundaries among these regions; and
    constructing the indoor map based on these constituent elements; wherein these regions have a convex planar shape, and the regions containing the accessible boundaries are the accessible regions.

2. The key point based guiding navigation method as recited in claim 1, wherein the constituent elements further include floors; the regions further include connection regions; and the floors are connected with each other by these connection regions.

3. A key point based guiding navigation method, comprising the following steps:
    based on a first location and a second location, determining a plurality of navigation points from among a plurality of key points located in a predetermined indoor map, where the key points are used to represent accessible directions in the indoor map;
    generating navigation information for pilot based on orientation of a specific navigation point relative to a current location; and
    following a predefined displaying rule and based on at least part of the indoor map, displaying the navigation information and navigation point and/or second location, wherein determination of navigation points from the key points of the predefined indoor map based on a first and second locations comprising the following steps:
  connecting the first and second locations through the key points to form a plurality of navigation paths;
  calculating attribute distance of each navigation path, said attribute distance of each navigation path being obtained by calculation of a physical distance and passability attribute of the same navigation path; and
  selecting the key points contained in a navigation path having the shortest attribute distance as the navigation points.

4. A key point based guiding navigation method, comprising the following steps:
  based on a first location and a second location, determining a plurality of navigation points from among a plurality of key points located in a predetermined indoor map, where the key points are used to represent accessible directions in the indoor map;
  generating navigation information for pilot based on orientation of a specific navigation point relative to a current location; and
  following a predefined displaying rule and based on at least part of the indoor map, displaying the navigation information and navigation point and/or second location, wherein the navigation points are obtained by following steps:
  determining key points adjacent to the first location and obtaining a set S{P} of the key points, here, P representing the key points adjacent to the first location;
  connecting each key point of the set S{P} to a next adjacent key point until a last key point is connected to the second location so as to obtain a plurality of navigation paths running from each key point to the second location, all the key points contained in a respective navigation path being a subset P{M} of the set S{P};
  calculating the attribute distance of corresponding navigation paths of the subset P{M}, said attribute distance of each navigation path being obtained by calculation of a physical distance and passability attribute of the same navigation path; and
  selecting the key points contained in a navigation path having the shortest attribute distance of the subset P{M} as the navigation points.

5. The key point based guiding navigation method as recited in claim 3, wherein a physical distance of the navigation path includes straight distances between various sub-paths of the navigation path; and/or the passability attribute of the navigation path includes predefined passability parameters of a region in which various sub-paths locate; the sub-paths of the navigation path include lines each connects two adjacent nodes together within the same navigation path; and the nodes include the first location, key points, and second location.

6. The key point based guiding navigation method as recited in claim 5, wherein the attribute distance of the navigation path is a sum of multiplications of respective passability parameters corresponding to specific sub-paths by respective straight distances.

7. The key point based guiding navigation method as recited in claim 5, wherein the navigation points are displayed in a sequence same as the sequence in which the key points are arranged in a navigation path having the shortest attribute distance.

8. The key point based guiding navigation method as recited in claim 7, wherein the navigation information for pilot is generated based on orientation of a specific navigation point relative to a current location, and this process of generation includes the following steps:
  generating navigation information indicating a direction from the current location to the next navigation based on orientation of a next navigation point relative to the current location, said next navigation point being closest to the current location.

9. A key point based guiding navigation method, comprising the following steps:
  based on a first location and a second location, determining a plurality of navigation points from among a plurality of key points located in a predetermined indoor map, where the key points are used to represent accessible directions in the indoor map;
  generating navigation information for pilot based on orientation of a specific navigation point relative to a current location; and
  following a predefined displaying rule and based on at least part of the indoor map, displaying the navigation information and navigation point and/or second location, wherein the predefined displaying rule comprises: displaying the navigation information at a predefined location in a line connecting the current location and said next navigation point, wherein the predefined displaying rule further includes: when it is determined that the distance between the current location and a next navigation point is shorter than a predefined distance, the navigation information is updated to indicate a direction pointing to a further next navigation point of the next navigation point from the current location.

10. The key point based guiding navigation method as recited in claim 5, wherein the predefined displaying rule further includes:
  based on distance between the current location and said next navigation point and relative orientation, determining whether the current location is deviated from the navigation path;
  when it is determined that the current location is deviated from the path, taking the current location as a first location and a new navigation path and corresponding navigation points being recalculated; and
  when it is determined that the newly generated navigation path has an attribute distance shorter than the original navigation path, updating corresponding navigation points and navigation information in view of the newly generated path.

11. A key point based guiding navigation device, comprising:
  a navigation point analysis unit for determination of navigation points from a plurality of key points shown in an indoor map based on a first and second locations, said key points representing accessible directions in the indoor map;
  a navigation generation unit for generating navigation information for pilot based on orientation of a specific navigation point relative to a current location; and
  a navigation display unit for displaying the navigation information and navigation point and/or second location following a predefined displaying rule and based on at least part of the indoor map;
  further comprising a map construction unit for:
  converting an indoor floor plan into image data of a predetermined format;
  generating a plurality of constituent elements for constructing the indoor map based on indoor structure represented by the image data, where the constituent elements include regions and key points located on several accessible boundaries among these regions;

constructing the indoor map based on these constituent elements;

wherein these regions have a convex planar shape, and the regions containing the accessible boundaries are the accessible regions.

12. The key point based guiding navigation device as recited in claim 11, wherein the constituent elements further include floors; the regions further include connection regions; and the floors are connected with each other by these connection regions.

13. A key point based guiding navigation device, comprising:

a navigation point analysis unit for determination of navigation points from a plurality of key points shown in an indoor map based on a first and second locations, said key points representing accessible directions in the indoor map;

a navigation generation unit for generating navigation information for pilot based on orientation of a specific navigation point relative to a current location; and a navigation display unit for displaying the navigation information and navigation point and/or second location following a predefined displaying rule and based on at least part of the indoor map, wherein the navigation point analysis unit determines the navigation points from a plurality of key points shown in an indoor map based on a first and second locations and includes:

connecting the first and second locations through the key points to form a plurality of navigation paths;

calculating attribute distance of each navigation path, said attribute distance of each navigation path being obtained by calculation of a physical distance and passability attribute of the same navigation path; and selecting the key points contained in a navigation path having the shortest attribute distance as the navigation points.

14. A key point based guiding navigation device, comprising:

a navigation point analysis unit for determination of navigation points from a plurality of key points shown in an indoor map based on a first and second locations, said key points representing accessible directions in the indoor map:

a navigation generation unit for generating navigation information for pilot based on orientation of a specific navigation point relative to a current location; and a navigation display unit for displaying the navigation information and navigation point and/or second location following a predefined displaying rule and based on at lease part of the indoor map, wherein the navigation point analysis unit determines the navigation points from a plurality of key points shown in an indoor map based on a first and second locations and includes:

determining key points adjacent to the first location an obtain a set $S\{P\}$ of the key points, here, P representing the key points adjacent to the first location;

connecting each key point of the set $S\{P\}$ to a next adjacent key point until a last key point is connected to the second location so as to obtain a plurality of navigation paths running from each key point to the second location, all the key points contained in a respective navigation path being a subset $P\{M\}$ of the set $S\{P\}$;

calculating the attribute distance of corresponding navigation paths of the subset $P\{M\}$, said attribute distance of each navigation path being obtained by calculation of a physical distance and passability attribute of the same navigation path; and selecting the key points contained in a navigation path having the shortest attribute distance of the subset $P\{M\}$ as the navigation points.

15. The key point based guiding navigation device as recited in claim 13, wherein a physical distance of the navigation path includes straight distances between various sub-paths of the navigation path; and/or the passability attribute of the navigation path includes predefined passability parameters of a region in which various sub-paths locate; the sub-paths of the navigation path include lines each connects two adjacent nodes together within the same navigation path; and the nodes include the first location, key points, and second location.

16. The key point based guiding navigation device as recited in claim 15, wherein the attribute distance of the navigation path is a sum of multiplications of respective passability parameters corresponding to specific sub-paths by respective straight distances.

17. The key point based guiding navigation device as recited in claim 15, wherein the navigation points are displayed by the navigation display unit in a sequence same as the sequence in which the key points are arranged in a navigation path having the shortest attribute distance.

18. A key point based guiding navigation device, comprising:

a navigation point analysis unit for determination of navigation points from a plurality of key points shown in an indoor map based on a first and second locations, said key points representing accessible directions in the indoor map:

a navigation generation unit for generating navigation information for pilot based on orientation of a specific navigation point relative to a current location; and a navigation display unit for displaying the navigation information and navigation point and/or second location following a predefined displaying rule and based on at least part of the indoor map, wherein the predefined displaying rule of the navigation display unit comprises: displaying the navigation information at a predefined location in a line connecting the current location and said next navigation point, and wherein the predefined displaying rule of the navigation display unit includes: when it is determined that the distance between the current location and a next navigation point is shorter than a predefined distance, the navigation information is updated to indicate a direction pointing to a further next navigation point of the next navigation point from the current location.

19. The key point based guiding navigation device as recited in claim 12, wherein the predefined displaying rule of the navigation display unit includes:

based on distance between the current location and said next navigation point and relative orientation, determining whether the current location is deviated from the navigation path;

when it is determined that the current location is deviated from the path, taking the current location as a first location and a new navigation path and corresponding navigation points being recalculated; and when it is determined that the newly generated navigation path has an attribute distance shorter than the original navigation path, updating corresponding navigation points and navigation information in view of the newly generated path.

* * * * *